Nov. 25, 1947.　　　　G. E. DATH　　　　2,431,375
FRICTION SHOCK ABSORBING MECHANISM
Filed Nov. 29, 1943
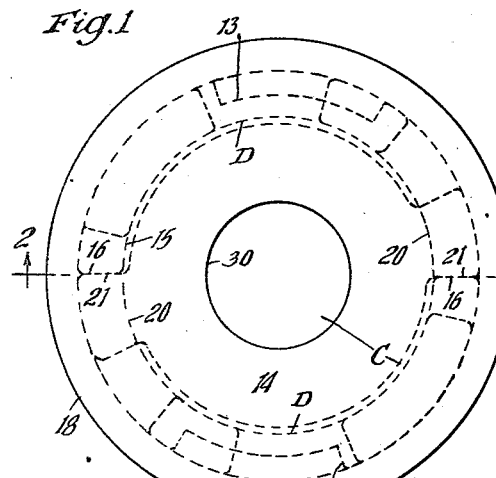
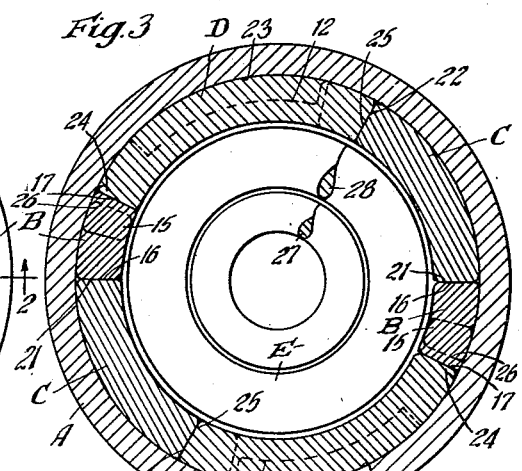
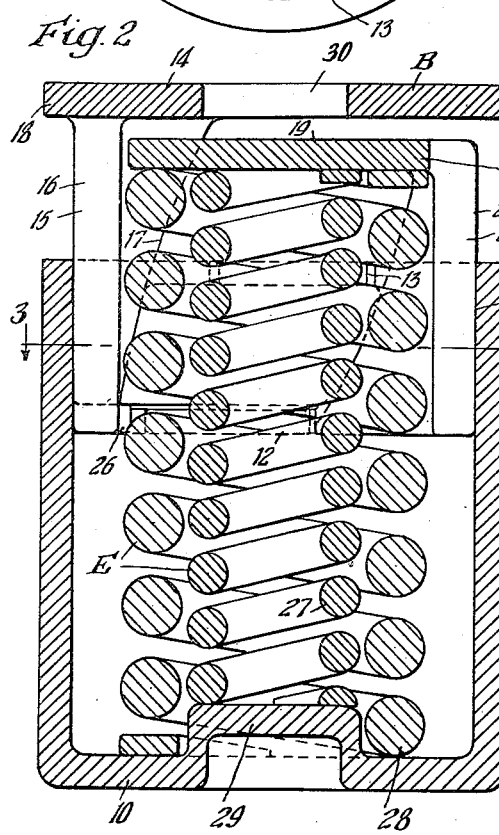
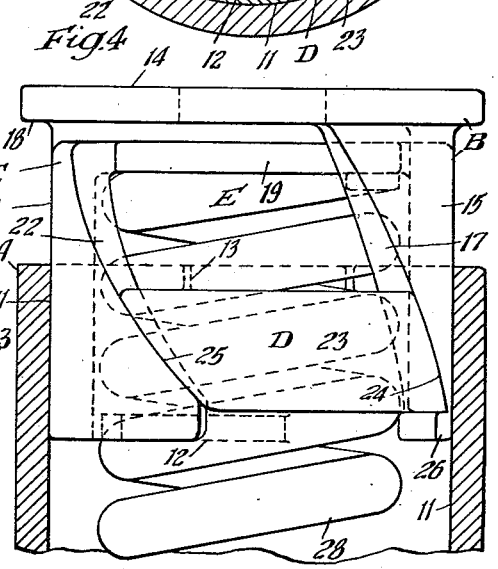
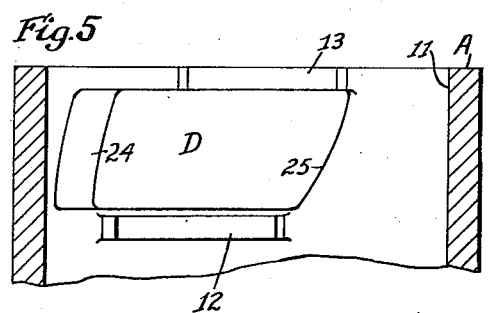
Inventor
George E. Dath
By Henry Fuchs.
Atty.

Patented Nov. 25, 1947

2,431,375

UNITED STATES PATENT OFFICE 2,431,375

FRICTION SHOCK ABSORBING MECHANISM

George E. Dath, Chicago, Ill., assignor to W. H. Miner, Inc., Chicago, Ill., a corporation of Delaware Application November 29, 1943, Serial No. 512,111

19 Claims. (Cl. 267—9)

This invention relates to improvements in friction shock absorbing mechanisms, especially adapted for use in connection with truck springs of railway cars for dampening or snubbing the action of the springs.

One object of the invention is to provide a combined spring and friction shock absorber of high spring resistance capacity.

Another object of the invention is to provide a friction shock absorbing mechanism including a friction casing; friction shoes slidably engaging the walls of the casing; pressure transmitting wedge means; combined spring follower and wedge means; and spring means opposing movement of the combined spring follower and wedge means, wherein the wedge means and combined spring follower and wedge means have wedging engagement with the shoes to effect sliding movement of the latter in a direction transversely of the friction casing.

A more specific object of the invention is to provide a mechanism as specified in the preceding paragraph, wherein the friction casing is in the form of a cylindrical shell, presenting an interior cylindrical friction surface with which the shoes have rotary sliding engagement to provide the desired frictional resistance.

Other objects of the invention will more clearly appear from the description and claims hereinafter following.

In the drawing forming a part of this specification, Figure 1 is a top plan view of my improved shock absorbing mechanism. Figure 2 is a transverse vertical sectional view, corresponding substantially to the line 2—2 of Figure 1. Figure 3 is a horizontal sectional view, corresponding substantially to the line 3—3 of Figure 2. Figure 4 is a vertical sectional view, similar to Figure 2, showing the upper end portion of the mechanism only, the casing being shown in section and the other parts of the mechanism being shown in side elevation. Figure 5 is a view similar to Figure 2, of the upper end portion of the friction casing of my improved mechanism, showing the cooperating friction shoe and guide ribs, all other parts being omitted in this figure.

As shown in the drawing, my improved shock absorbing mechanism comprises broadly a friction casing A; a pressure transmitting wedge member B; a combined wedge and spring follower member C; a pair of friction shoes D—D; and a spring resistance E.

The friction casing A is in the form of a cylindrical shell open at the top end and closed at the bottom end by a transverse wall 10. At the open front end thereof, the casing presents an interior cylindrical friction surface 11, which is continuous around the same. Interiorly of the casing, at said open end, are provided inner and outer transverse guide ribs 12 and 13. The inner and outer ribs 12 and 13 are spaced apart lengthwise of the casing, being located respectively at the inner and outer ends of the friction surface 11. The ribs 12 are two in number and are spaced circumferentially, as shown, being diametrically opposite. The ribs 13 are also two in number and are circumferentially spaced. The ribs 12 and 13 at each side of the casing are circumferentially offset with respect to each other, as shown, to provide clearance for the wedge projections of the members B and C.

The edge member B comprises a disc-like upper end portion 14 and a pair of diametrically opposite, inwardly extending wedge projections 15—15 on said disc portion. The wedge projections 15—15 are in the form of transversely curved blades adapted to telescopically fit loosely within the open top end of the casing. Each wedge projection has a straight abutment face 16 at one end edge which extends lengthwise of the mechanism and an inclined wedge face 17 at the other end edge of helical form, the wedge faces 17—17 of the two projections being at corresponding ends thereof. The blade portions 15—15 of the wedge member B are telescoped within the open end of the casing in the circumferential spaces between the circumferentially spaced pairs of ribs 12—13. The disc portion 14 of the member B projects laterally outwardly of the blades 15—15, as indicated at 18, thereby providing a flangelike portion adapted to engage with the outer end of the side wall of the casing A to limit inward movement of the wedge member. The flange 18 also serves to center the device when used with spring follower plates which have centering flanges for the spring units of a truck spring cluster.

The combined wedge and spring follower member C comprises an outer disc portion 19 and a pair of diametrically opposite, inwardly extending, wedge projections 20—20 on said disc portion. The wedge projections 20—20 are in the form of transversely curved blades adapted to loosely fit within the open end of the casing. The disc portion 19 of the member C is of smaller diameter than the disc 14 of the member B so as to have a loose fit between the blades of the latter. Each blade 20 has a straight abutment face 21 at one end edge thereof, extending lengthwise of the mechanism, and an inclined wedge face 22 at the other end edge of helical formation, the wedge faces 22—22 of the two projections being at corresponding ends thereof.

The combined wedge and spring follower member C is arranged within the member B and has the blades 20—20 thereof telescoped within the open end of the casing with the straight abutment edges 21—21 thereof respectively in engagement with the straight abutment edges 16—16 of the blades 15—15 of the member B. As shown most clearly in Figure 4, the wedge faces or edges 22—22 of the projections or blades 20—20 of the member C are reversely inclined to the wedge faces or edges 17—17 of the projections or blades 15—15 of the member B. Inasmuch as the wedge faces 17 and 22 are all radial to the central longitudinal axis of the mechanism, opposed faces 17 and 22 converge laterally inwardly.

The friction shoes D, which are two in number, are in the form of transversely curved, elongated plates, the curvature of each plate corresponding to that of the interior of the casing. The two shoes or plates D—D are disposed at diametrically opposite sides of the mechanism between the ribs 12 and 13 of the casing, and embraced between the opposed wedge faces 17 and 22 of the corresponding wedge projections of the members B and C.

Each shoe has a cylindrical outer friction surface 23 slidably engaged with the interior friction surface 11 of the casing. At opposite end edges, each shoe is provided with inclined wedge faces 24 and 25, of helical form engaging respectively with and correspondingly inclined to the wedge faces 17 and 22 of the corresponding wedge projections 15 and 20 of the members B and C. As will be evident, the friction shoes D—D are confined to rotary sliding movement around the casing A by the ribs 12 and 13.

To limit outward movement of the wedge member B and hold the same assembled with the casing A, each blade 15 of said member B is provided with a retaining lug 26 projecting from the lower end of said blade at the wedge face edge thereof and engaging underneath the adjacent end portion of the corresponding shoe.

The spring resistance E comprises a light inner coil 27 and a heavier outer coil 28. The springs 27 and 28 are disposed within the casing and have their upper ends bearing on the inner side of the disc 19 of the combined spring follower and wedge C. At the bottom end, the outer coil 28 bears directly on the bottom wall 10 of the casing and the inner coil bears on an inwardly projecting hollow boss 29 formed on said wall 10. In the assembled condition of the mechanism, the spring resistance is preferably under a predetermined amount of initial compression.

The hollow boss 29 is provided to accommodate the usual spring centering projection on the bottom spring follower plate commonly employed with spring clusters of railway car trucks, and an opening 30 is provided in the disc 14 of the wedge member B to accommodate the spring centering projection of the cooperating top spring follower plate of the spring cluster.

In assembling the mechanism, the friction shoes D—D are first placed within the casing A, between the ribs 12 and 13. The springs 27—28 are then placed in position and the combined wedge and spring follower C engaged thereover with the disc 19 thereof resting on the springs and the wedge projections 20—20 extending into the casing and adjusted so that the wedge faces 22—22 thereof engage in back of the wedge faces 25—25 of the shoes D—D. The wedge member B is then applied by first inserting the wedge projections 15—15 thereof within the open end of the casing between the shoes D—D and the wedge projections 20—20 of the member C, the straight edge faces 16—16 of the wedge projections 15—15 being brought into abutment with the straight edge faces 21—21 of the wedge projections 20—20. The member C is then forced inwardly of the casing to a predetermined extent by a tool engaged through the opening 30 of the member B, to withdraw the wedge faces 22—22 from the wedge faces 25—25 of the shoes and thereby permit sufficient rotary displacement of the shoes, unopposed by the spring resistance E, to allow the wedge projections of the member B to be forced inwardly to an extent to engage the lugs 26—26 of the latter in back of the shoes D—D. After the wedge member B has been forced inwardly and the lugs thereof engaged with the shoes, the holding tool is removed, thereby permitting the spring to project the combined wedge and spring follower C outwardly and wedge the shoes D against the wedge faces 17—17 of the wedge projections of the wedge member B. The parts are thus brought to the normal full release position shown in the drawings, outward movement of the wedge B being limited by the lugs thereof engaging the shoes, and the shoes being held against outward movement by the outer guide ribs 13 of the casing.

My improved shock absorber preferably replaces one of the spring units of a truck spring cluster of a railway car; however, several of these shock absorber units may be employed in a spring cluster replacing two or more spring units of the same. As will be understood by those skilled in this art, the shock absorber which replaces the spring unit of the spring cluster is compressed between the top and bottom spring follower plates of the cluster as the truck springs are compressed.

The operation of my improved friction shock absorbing mechanism is as follows: Upon the spring cluster of the truck of the railway car being compressed between the spring follower plates, the friction shock absorbing mechanism is compressed therewith, thereby effecting relative approach of the wedge member B and the casing A in lengthwise direction. The wedge B is thus forced inwardly of the casing A, wedging the shoes circumferentially against the wedge projections of the combined wedge and spring follower C, forcing the latter inwardly against the spring resistance E. Due to the laterally inwardly converging relation of the wedge faces 17 and 22 which embrace each shoe, the shoes are forced outwardly into tight frictional engagement with the friction surfaces of the casing. As compression of the mechanism continues the shoes are forced to slide circumferentially around the casing A on the friction surfaces 11 thereof, thereby providing the desired friction shock absorbing capacity. As will be evident, the spring resistance capacity during compression of the mechanism is exceptionally high due to the fact that the design and arrangement of the parts of my improved mechanism provides for maximum length and diameter being used.

I have herein shown and described what I now consider the preferred manner of carrying out my invention, but the same is merely illustrative and I contemplate all changes and modifications that come within the scope of the claims appended hereto.

I claim:

1. In a friction shock absorbing mechanism, the combination with a cylindrical friction casing having an interior cylindrical friction surface; of a pressure transmitting wedge member having a wedge projection telescoped within the casing; a combined wedge and spring follower member within the casing; means for limiting relative movement of said members to movement in a direction lengthwise of the casing; spring means within the casing opposing inward movement of said combined wedge and spring follower member; a friction shoe interposed between said members in wedging engagement therewith, said shoe having a transversely curved friction surface circumferentially slidable on said interior friction surface of the casing; and means limiting said shoe to circumferential sliding movement.

2. In a friction shock absorbing mechanism, the combination with a cylindrical friction casing having an interior cylindrical friction surface; of inner and outer circumferential guide ribs on the inner wall of said casing at the inner and outer ends of said friction surface; a friction shoe within the casing guided between said ribs, said shoe having an outer cylindrical friction surface in circumferential sliding engagement with the cylindrical friction surface of the casing; inner and outer wedge members having wedging engagement with opposite ends of said shoe; means for limiting relative movement of said members to movement in a direction lengthwise of the casing; and spring means within the casing yieldingly opposing inward movement of said inner wedge member 3. In a friction shock absorbing mechanism, the combination with a cylindrical friction casing; of a friction shoe having a cylindrical friction surface slidably engaging the interior wall of the casing; means for limiting said shoe to movement circumferentially of the casing; inner and outer wedge members having wedging engagement with opposite ends of said shoe; means for limiting relative movement of said members to movement in a direction lengthwise of the casing; and spring means within the casing yieldingly opposing inward movement of said inner wedge member.

4. In a friction shock absorbing mechanism, the combination with a tubular casing having an interior friction surface; of a wedge member having a plurality of wedge projections telescoped within the casing; a combined wedge and spring follower member within the casing; interengaging guide faces on said wedge projections of said members confining the latter to relative movement with respect to each other in a direction lengthwise of the casing; spring means within the casing opposing inward movement of said combined wedge and spring follower member; friction shoes within the casing and having wedging engagement with said members; and means for limiting said shoes to sliding movement circumferentially of the casing.

5. In a friction shock absorbing mechanism, the combination with a cylindrical friction casing having an interior cylindrical friction surface; of a pressure transmitting wedge member having a plurality of wedge projections telescoped within said casing; a combined wedge and spring follower member within the casing, said last named member having a plurality of wedge projections; abutment means on said wedge projections of said members respectively for holding said members against relative rotation toward each other; spring means within the casing opposing inward movement of said combined wedge and spring follower member; a plurality of friction shoes interposed between said members, each shoe being in wedging engagement with one of the wedge projections of each of said members, said shoes having transversely curved friction surfaces circumferentially slidable on said interior friction surface of the casing; and means limiting said shoes to circumferential sliding movement.

6. In a friction shock absorbing mechanism, the combination with a cylindrical friction casing having an interior cylindrical friction surface; of circumferential guide ribs on the inner wall of said casing at the inner and outer ends of said friction surface; a plurality of friction shoes within the casing guided between said ribs, each shoe having an outer cylindrical friction surface in circumferentially sliding engagement with the cylindrical friction surface of the casing; inner and outer wedge members movable lengthwise of the casing and having wedging engagement with opposite ends of each of said shoes; abutting guide portions on said inner and outer members holding the same against rotation toward each other; and spring means within the casing opposing inward movement of said inner wedge member.

7. In a friction shock absorbing mechanism, the combination with a cylindrical friction casing; of a plurality of friction shoes arranged circumferentially around the interior of the casing and having cylindrical friction surfaces slidingly engaging the interior wall of the casing; means limiting said shoes to movement circumferentially around the casing; inner and outer wedge members having wedging engagement with opposite ends of each shoe; said wedge members having shouldered engagement with each other for locking the same against rotation toward each other; and spring means within the casing yieldingly opposing inward movement of said inner wedge member.

8. In a friction shock absorbing mechanism, the combination with a cylindrical friction casing having an interior cylindrical friction surface; of a pressure transmitting wedge member movable lengthwise of the casing and having a plurality of wedge projections telescoped within said casing each of said projections having a wedge face at one side and a guide face at the opposite side extending lengthwise of the mechanism; a combined wedge and spring follower member within the casing movable lengthwise of the latter, said last named member having a plurality of wedge projections alternated with the wedge projections of said first named member, each of said last named projections having a wedge face on one side thereof and a guide face on the opposite side extending lengthwise of the mechanism and engaging the guide face of the corresponding projection of the first named member; spring means within the casing opposing inward movement of said combined wedge and spring follower member; a plurality of friction shoes interposed between said members, each shoe being in wedging engagement with the wedge faces of one of the wedge projections of each of said members, said shoes having transversely curved friction surfaces circumferentially slidable on said interior friction surface of the casing; and means limiting said shoes to circumferential sliding movement.

9. In a friction shock absorbing mechanism, the combination with a cylindrical friction casing having an interior cylindrical friction surface; of circumferential guide ribs on the inner wall of said casing at the inner and outer ends of said friction surface; a plurality of friction shoes within the casing guided between said ribs, each shoe having an outer cylindrical friction surface in circumferentially sliding engagement with the cylindrical friction surface of the casing; inner and outer wedge members, each having a plurality of wedge projections, said wedge projections of the inner member being alternated with the projections of the outer member, the wedge projections of the outer member having wedging engagement with the respective shoes at one set of ends thereof and the wedge projections of said inner member having engagement with said shoes at the opposite set of ends thereof, said wedge projections of each of said two members respectively having lengthwise extending guide faces in sliding abutment with each other; and spring means opposing inward movement of said inner member.

10. In a friction shock absorbing mechanism, the combination with a cylindrical friction casing having an interior cylindrical friction surface; of a pressure transmitting wedge member having a wedge projection telescoped within the casing; a combined wedge and spring follower member within the casing; means for limiting relative movement of said members to movement in a direction lengthwise of the casing; spring means within the casing opposing inward movement of said combined wedge and spring follower member; a friction shoe interposed between said members in wedging engagement therewith, said shoe having a transversely curved friction surface circumferentially slidable on said interior friction surface of the casing; means limiting said shoe to circumferential sliding movement; and a lug on the wedge projection of said wedge member having hooked engagement with the shoe to limit outward movement of the wedge member.

11. In a friction shock absorbing mechanism, the combination with a cylindrical friction casing having an interior cylindrical friction surface; of inner and outer circumferentially extending guide ribs on said casing embracing the friction surface therebetween; a friction shoe slidably guided between said inner and outer guide ribs and having wedge faces at opposite ends thereof; an outer wedge member having an inwardly extending wedge projection engaging the wedge face at one end of said shoe; an inner combined wedge member and spring follower having a wedge projection engaging the wedge face at the other end of the shoe; means for limiting relative movement of said members to movement in a direction lengthwise of the casing; and spring means within the casing opposing inward movement of said inner member.

12. In a friction shock absorbing mechanism, the combination with a cylindrical friction casing having an interior cylindrical friction surface; of inner and outer circumferentially extending guide ribs on said casing embracing the friction surface therebetween; circumferentially spaced friction shoes within the casing, each shoe being slidably guided between said inner and outer ribs and having wedge faces at opposite ends thereof; an outer wedge member having a plurality of inwardly extending wedge projections; an inner combined wedge and spring follower member having a plurality of wedge projections alternated with the wedge projections of said first named member, adjacent wedge projections of said first and second named members abutting each other on faces extending lengthwise of the mechanism and being engaged between adjacent shoes, said adjacent projections having respectively wedging engagement with said adjacent shoes; and spring means within the casing opposing inward movement of said inner member.

13. In a friction shock absorbing mechanism, the combination with a cylindrical friction casing having an interior cylindrical friction surface; of inner and outer circumferentially extending guide ribs on said casing embracing the friction surface therebetween; circumferentially spaced friction shoes within the casing, each shoe being slidably guided between said inner and outer ribs and having wedge faces at opposite ends thereof; an outer wedge member having a plurality of wedge blades projecting therefrom, each blade having an abutment face at one edge thereof and a wedge face at the other end, said blades extending respectively between adjacent shoes; an inner combined wedge and spring follower member having a plurality of wedge blades alternated with the wedge blades of said first named member, each blade of said combined member having an abutment face at one edge thereof and a wedge face at the other end, said blades of said combined member extending respectively between adjacent shoes, each of said last named blades having the abutment face thereof engaged with the abutment face of the corresponding blade of the outer member, the wedge faces of each set of engaged blades of said outer and inner members respectively engaging the wedge faces of said adjacent shoes; and spring means yieldingly opposing inward movement of said inner member.

14. In a friction shock absorbing mechanism, the combination with a lengthwise disposed friction member; of a friction shoe having sliding frictional engagement with said member, said shoe being confined to movement in a lateral direction; a pressure transmitting wedge member movable inwardly lengthwise of said friction member and having wedging engagement with said shoe to move the same laterally and force the same against said friction surface; a combined wedge and spring follower having wedging engagement with said shoe for forcing the same against said friction surface and resisting lateral sliding movement of said shoe; means for limiting relative movement of said pressure transmitting wedge and combined wedge and spring follower to movement in a direction lengthwise of said friction member; and means for resisting movement of said combined wedge and spring follower inwardly of said friction member.

15. In a friction shock absorbing mechanism, the combination with a tubular friction casing extending lengthwise of the mechanism and having an interior friction surface; of a member having a wedge projection engaged within the casing and movable inwardly lengthwise thereof; a spring follower member within the casing having a wedge projection, said follower being movable lengthwise of the casing; spring means within the casing opposing inward movement of said spring follower member; a friction shoe slidable on said friction surface, said shoe being interposed between the wedge projections of said members; and means for holding said shoe against movement lengthwise of the casing.

16. In a friction shock absorbing mechanism, the combination with a tubular casing extending lengthwise of the mechanism having an interior friction surface; of inner and outer guide ribs on the interior of the casing at the inner and outer ends of said friction surface, said ribs being disposed in parallel planes normal to the central longitudinal axis of the casing; a wedge member having a wedge projection telescoped within the end of the casing, said wedge member being movable lengthwise of said casing; a combined wedge and spring follower member within the casing; means for restricting relative movement of said members to movement in a direction lengthwise of the casing; spring means within the casing opposing inward movement of said combined wedge and spring follower member; and a friction shoe slidably guided between said ribs and having sliding engagement with the friction surface of the casing, said shoe being in wedging engagement at opposite ends with said combined wedge and spring follower member and the projection of said wedge member.

17. In a friction shock absorbing mechanism, the combination with a tubular friction casing having an interior friction surface and guide ribs at the inner and outer ends of said friction surface, said ribs being disposed in planes normal to the central longitudinal axis of the mechanism; of a wedge member having a plurality of wedge projections telescoped within the end of the casing, said wedge member being movable lengthwise of the casing; a combined wedge and spring follower member within the casing, said last named member having a plurality of wedge projections; engaging guide faces on the wedge projections of said wedge member and the wedge projections of said combined wedge and spring follower member holding said members against rotation toward each other, said combined wedge and spring follower member being movable lengthwise of the casing; spring means within the casing opposing inward movement of said combined wedge and spring follower member; and a plurality of friction shoes slidably guided between said guide ribs and having sliding engagement with the friction surface of the casing, each of said shoes having wedging engagement at opposite ends respectively with one of the wedge projections of the wedge member and one of the wedge projections of said combined wedge and spring follower member.

18. In a friction shock absorbing mechanism, the combination with a tubular friction casing having an interior friction surface; of a wedge member having a wedge projection telescoped within the casing; a combined wedge and spring follower member within the casing, said combined member having a wedge projection, said wedge projections of said members having overlapping engagement with each other to lock said members against rotation toward each other; spring means within the casing opposing inward movement of said combined wedge and spring follower members; a friction shoe interposed between said members; a retaining lug on said projection of the wedge members having shouldered engagement with the shoe to limit outward displacement of the wedge member; and means for limiting said shoe to lateral sliding movement.

19. In a friction shock absorbing mechanism, the combination with a tubular friction casing having an interior friction surface and transverse guide ribs at the inner and outer ends of said friction surface disposed in planes normal to the longitudinal central axis of the mechanism; of a wedge member having a wedge projection telescoped within the end of the casing; a combined wedge and spring follower member within the casing; spring means within the casing opposing inward movement of said combined wedge and spring follower member; a friction shoe slidably guided between said guide ribs and having sliding engagement with the friction surface of said casing, said shoe being in wedging engagement with said combined wedge and spring follower member and the wedge projection of said wedge member; means for holding said wedge member and said combined wedge and spring follower member against being spread apart by said shoe; and a lug on said wedge projection of the wedge member engaged in back of said shoe to limit outward movement of said wedge member.

GEORGE E. DATH.

REFERENCES CITED

The following references are of record in the file of this patent:

UNITED STATES PATENTS

| Number | Name | Date |
| --- | --- | --- |
| 670,320 | Janney | Mar. 19, 1901 |
| 754,942 | Thornburgh | Mar. 15, 1904 |
| 884,585 | Hitchcock | Apr. 14, 1908 |
| 1,761,272 | O'Connor | June 3, 1930 |
| 1,853,933 | Schmidt | Apr. 12, 1932 |
| 2,156,779 | Duryea | May 2, 1939 |
| 2,276,228 | Cottrell | Mar. 10, 1942 |